(12) United States Patent
Orlamünder (10) Patent No.: US 9,963,140 B2
(45) Date of Patent: May 8, 2018

(54) HYBRID MODULE AND DRIVE TRAIN HAVING SUCH A MODULE

(71) Applicant: ZF Friedrichshafen AG, Friedrichshafen (DE)

(72) Inventor: Andreas Orlamünder, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days. days.

(21) Appl. No.: 15/124,155

(22) PCT Filed: Dec. 17, 2014

(86) PCT No.: PCT/EP2014/078152
§ 371 (c)(1),
(2) Date: Sep. 7, 2016

(87) PCT Pub. No.: WO2015/139790
PCT Pub. Date: Sep. 24, 2015

(65) Prior Publication Data
US 2017/0210375 A1   Jul. 27, 2017

(30) Foreign Application Priority Data
Mar. 19, 2014 (DE) .................. 10 2014 205 136

(51) Int. Cl.
*F16F 15/12*   (2006.01)
*B60W 20/17*   (2016.01)
(Continued)

(52) U.S. Cl.
CPC .............. *B60W 20/17* (2016.01); *B60L 11/14* (2013.01); *B60L 11/1877* (2013.01);
(Continued)

(58) Field of Classification Search
CPC ..... F16F 15/123; F16F 15/129; F16F 15/1297
(Continued)

(56) References Cited

U.S. PATENT DOCUMENTS 5,725,080 A  *  3/1998  Lohaus .................. F16F 15/123
                                                             192/213.22
8,587,237 B2 * 11/2013  Kobayashi ............... B60K 6/48
                                                              280/108
(Continued)

FOREIGN PATENT DOCUMENTS

DE   19510833.7   *  3/1995  ............ F16F 15/123
DE   19748665       5/1999
(Continued)

OTHER PUBLICATIONS

Drivetrain architectures and their impact on the choice of the electrical machine;Arno Mathoy; Proceedings of the 2011 14th European Conference on Power Electronics and Applications; Year: 2011.*
(Continued)

*Primary Examiner* — Cuong H Nguyen
(74) *Attorney, Agent, or Firm* — Cozen O'Connor (57) ABSTRACT

A hybrid module (2) with a vibration reducing system (4) which is coupled between an output side (8) and an input side (6) of the hybrid module (2). The vibration reducing system (4) is configured to reduce an injected torsional irregularity, wherein the vibration reducing system (4) has a preload that is greater than an assembly-related preload. The hybrid module (2) also includes an electric machine (10) which is coupled to the input side (6) or to the output side (8) of the hybrid module (2). The electric machine (10) is configured to introduce a torque at the input side (6) or at the output side (8) which is directed against a rotational irregu-
(Continued)

larity coming from a drive arrangement (5) in order to reduce the rotational irregularity.

14 Claims, 8 Drawing Sheets

(51) Int. Cl.
  *B60L 15/20* (2006.01)
  *B60L 11/18* (2006.01)
  *B60L 11/14* (2006.01)
  *F16F 15/14* (2006.01)

(52) U.S. Cl.
  CPC .............. *B60L 15/20* (2013.01); *F16F 15/12* (2013.01); *F16F 15/1464* (2013.01); *B60L 2240/423* (2013.01); *B60L 2240/443* (2013.01); *B60W 2710/083* (2013.01); *B60Y 2300/188* (2013.01); *B60Y 2300/20* (2013.01); *B60Y 2400/112* (2013.01); *B60Y 2400/48* (2013.01); *Y10S 903/906* (2013.01)

(58) Field of Classification Search
  USPC .......................... 701/22; 188/269; 74/574.4
  See application file for complete search history.

(56) References Cited

U.S. PATENT DOCUMENTS

| | | | | |
|---|---|---|---|---|
| 9,353,798 | B2* | 5/2016 | Lorenz | F16F 15/13157 |
| 2006/0224282 | A1* | 10/2006 | Seo | B60K 6/365 |
| | | | | 701/22 |
| 2009/0125202 | A1* | 5/2009 | Swank | F16F 15/12353 |
| | | | | 701/68 |
| 2012/0081051 | A1* | 4/2012 | Kobayashi | B60K 6/48 |
| | | | | 318/400.23 |
| 2013/0073134 | A1* | 3/2013 | Yokouchi | B60K 6/365 |
| | | | | 701/22 |
| 2014/0025248 | A1 | 1/2014 | Angrick | |
| 2014/0109720 | A1* | 4/2014 | Werner | B60W 10/08 |
| | | | | 74/574.4 |
| 2014/0202278 | A1* | 7/2014 | Murata | F16F 15/1414 |
| | | | | 74/574.4 |
| 2014/0302937 | A1* | 10/2014 | Lorenz | F16F 15/13157 |
| | | | | 464/68.1 |

FOREIGN PATENT DOCUMENTS

| | | | |
|---|---|---|---|
| DE | 19934936 | 2/2000 | |
| DE | 10223426 | 12/2003 | |
| DE | 102007049075 | 4/2009 | |
| DE | 102008004079 | 7/2009 | |
| DE | 102011013483 | 9/2012 | |
| DE | 102012203778 | 10/2012 | |
| DE | 102012209275 | 1/2013 | |
| DE | 102012214362 | 2/2014 | |
| JP | 2010-222963 | * 9/2010 | ............... B60K 6/48 |
| WO | WO 2013000448 A1 | * 1/2013 | ............ B60W 10/08 |
| WO | WO 2013051117 A1 | * 4/2013 | ........... F16F 15/1414 |

OTHER PUBLICATIONS

DSP applications in hybrid electric vehicle powertrain; J. M. Miller; Bo Wu; E. Strangas; Proceedings of the 1999 American Control Conference (Cat. No. 99CH36251); Year: 1999, vol. 3; pp. 2137-2138 vol. 3, DOI: 10.1109/ACC.1999.786318.*

Optimal torque control of the Interior Permanent Magnet Synchronous Machine; Sabin-Constantin Carpiuc; Daniel-Ionut Patrascu; Corneliu Lazar; 2011 XXIII International Symposium on Information, Communication and Automation Technologies Year: 2011; pp. 1-8, DOI: 10.1109/ICAT.2011.6102091.*

* cited by examiner

HYBRID MODULE AND DRIVE TRAIN HAVING SUCH A MODULE

PRIORITY CLAIM

This is a U.S. national stage of application No. PCT/EP2014/078152, filed on Dec. 17, 2014. Priority is claimed on the following application(s): Country: Germany, Application No. 10 2014 205 136.3, Filed: Mar. 19, 2014; the content of which is incorporated in its entirety herein by reference.

FIELD OF THE INVENTION

The present invention is directed to a hybrid module having a vibration reducing system for reducing unwanted rotational irregularities or vibrations in the hybrid module or powertrain.

BACKGROUND OF THE INVENTION

Hybrid modules are used in many vehicles in various constructions. In some applications, the hybrid modules are connected to an internal combustion engine or combustion engine on an input side and to a shiftable transmission and further components of the powertrain on their output side. Rotational irregularities or unwanted vibrations can also be injected or coupled into the hybrid module via the internal combustion engine during transmission of a driving torque. A torque component that can lead to the unwanted vibrations or rotational irregularities may possibly also be attributable to an ignition behavior and/or a speed or operating condition of the internal combustion engine.

In many cases, the hybrid module comprises a vibration reducing system for reducing the unwanted vibrations in the hybrid module or powertrain. Accordingly, the vibration reducing system is intended to help homogenize an alternating torque resulting from a combustion engine or the internal combustion engine so that it does not lead to vibrations or noise excitation in the hybrid module, the powertrain or other components of a vehicle in which the hybrid module is installed. Unwanted vibrations can also be caused or promoted by other factors, for example, a roadway surface or subsurface over which the vehicle moves.

Therefore, conventional vibration reducing systems are mostly configured such that they can reduce vibrations occurring in all operating conditions of the combustion engine or driving conditions of the vehicle. As a result, conventional vibration reducing systems generally have a multistage vibration reducing system characteristic or spring characteristic with a knee. Conventional vibration reducing systems can be constructed, for example, as a two-mass flywheel, power split or converter combined with a torsion damper, a turbo torsion damper and/or a two-damper converter. In some cases, the aforementioned dampers are also combined with a speed adaptive mass damper. Vibration reducing systems of this kind are also known as passive vibration reducing systems.

In some hybrid modules, these passive vibration reducing systems can be combined with an electric machine for active vibration reduction or as active vibration reducing system. For example, DE 197 48 665 A1 discloses a device for vibration isolation in a powertrain of a motor vehicle. In this case, an electric machine is arranged as vibration reducing system in the powertrain upstream of a vibration isolation device. By means of the electric machine, torques are applied to the input shaft and to the output shaft, respectively, in such a way that the vibration isolation device has an increased or reduced effective spring stiffness.

Therefore, there is a need to find a better compromise between improved vibration reduction in a hybrid module and a simple construction of the hybrid module.

SUMMARY OF THE INVENTION

Embodiment examples are directed to a hybrid module with a vibration reducing system which is coupled between an output side and an input side of the hybrid module. Rotational irregularities that are coupled into the hybrid module can be reduced with the vibration reducing system. The vibration reducing system has a preload that is greater than an assembly-related preload. The hybrid module also comprises an electric machine which is coupled to the input side or to the output side of the hybrid module. With the electric machine, a torque can be introduced at the input side or at the output side which is directed against rotational irregularities coming from a drive arrangement in order to reduce them. Because the vibration reducing system has a preload that is higher than an assembly-related preload, the vibration reducing system in some embodiment examples can have a higher energy storage capability or characteristic for spring work than systems without any preload.

The rotational irregularity can be based on all possible, different types of excitations. The rotational irregularity can originate from a drive device, for example, an internal combustion engine or combustion engine or the drive behavior thereof. In addition or alternatively, the rotational irregularity can be injected at the input side or transmitted into the hybrid module at another location in the hybrid module, for example, at a shaft. A mechanical coupling of two components, for example, between the vibration reducing system and the hybrid module or the electric machine and the hybrid module, includes both direct and indirect coupling.

A preload which is greater than an assembly-related preload can be so high, for example, that the energy storage capability of the vibration reducing system substantially changes. In some cases, a preload of this kind can have the result that there may already be a need at a twist angle of 0° for a torque, also referred to as starting torque, in order to bring about a rotation or a response of the vibration reducing system. The starting torque which brings about a rotation or response of the vibration reducing system is greater than zero and/or the assembly-related preload of the vibration reducing system. In some cases, torques smaller than the starting torque would not lead to a response of the vibration reducing system. For example, an assembly-related preload can be a preloading of the vibration reducing system for bringing about a mechanical coupling or contact between the individual components of the vibration reducing system. A purely assembly-related preload may possibly only serve to position a spring element correctly between cover plates. An assembly-related preload can be less than 5% of a torque which can be delivered on the average by the internal combustion engine.

Therefore in some embodiment examples, the preload of the vibration reducing system corresponds at least to a proportion of 5% of a maximum torque that can be injected at the input side. Accordingly, an energy storage capability of the vibration reducing system could be increased sufficiently to improve vibration reduction in certain operating conditions. In order to improve the vibration reduction in other embodiment examples under other load conditions, for example, in ranges with higher speeds, the preload can correspond at least to a proportion of 10% or 20% of a maximum torque that can be injected on the input side. For example, the maximum torque that can be injected can be a maximum torque that can be supplied on the average by a drive device without a torque component of the rotational irregularity. The drive device can be an internal combustion engine or a combustion engine, for example.

In embodiment examples in which the hybrid module is coupled with an internal combustion engine, the preload can correspond to a torque which is greater than a torque component of a rotational irregularity occurring during starting or in a lower speed range of the internal combustion engine. Accordingly, it can be brought about in some embodiment examples that torque components of a rotational irregularity during starting or in lower speed ranges do not lead to a response of the vibration reducing system and are also not damped by the latter. In some embodiment examples, an operating state or a speed range, for example, the starting range of the internal combustion engine, can be completely removed by the preload of the vibration reducing system. According to embodiment examples, however, this is not brought about through the use of a stiffer vibration reducing system or a harder spring, but by the preload described above. A higher energy storage capability of the vibration reducing system can be brought about through the preload compared with the use of a harder spring. This makes it possible to configure softer vibration reduction stages or spring stages because only a smaller range of operating states or rotational irregularities is to be covered. In some embodiment examples, in that certain operating states or load states do not yet lead to a response of the vibration reducing system or of a spring element contained therein, it can be made possible that the full damping power and/or complete deformation path of the vibration reducing system or of the spring element can be utilized for other operating states and/or is not yet deformed or is completely available.

In some embodiment examples, the electric machine can be used in order to effectively reduce a rotational irregularity which occurs, for example, when starting or in a lower speed range of the internal combustion engine. Electric machines have the peculiarity that they can deliver a high torque at low speed or a frequency. The higher the speed or frequency, the more of its available torque must be used by the electric machine to accelerate its mass, e.g., the rotor. Accordingly, at higher speeds, the torque that can be effectively delivered by the electric machine is smaller. The additional torques that can be utilized by the electric machine on the exciter side for reducing vibrations are accordingly limited. Therefore, the electric machine is usually well suited to deliver a high torque at low speeds and a low torque at high speeds. Owing to this characteristic of the electric machine, it cannot be used as the sole vibration reducing system in many cases. The electric machine, also in combination with a storage, for example, is often not capable of smoothing all of the rotational irregularities brought about by an internal combustion engine in all operating states. Therefore, in many cases it is operated in connection with a passive vibration reducing system. For this purpose, a torque that is directed opposite to the torque component of the rotational irregularity or the torque of the rotational irregularity can be introduced into the hybrid module by the electric machine. In this way, a torque which the electric machine can provide at low speeds could be used to reduce rotational irregularities which can occur at low speeds.

In addition or alternatively, the vibration reducing system can be configured to reduce the rotational irregularity more sharply at a second speed than at a first speed at which a torque can be introduced by the electric machine for reducing the rotational irregularity. Further, in some embodiment examples the vibration reducing system or a vibration reducing system characteristic can be configured better because it need only cover a narrower range or can be designed for this range. The first speed can be lower than the second speed. During an operation of the hybrid module at the first speed, the electric machine can be utilized, for example in combination with a storage element, for reducing vibrations and can accordingly act as a spring element or active vibration reducing arrangement. Accordingly in some embodiment examples, the characteristic line of the passive vibration reducing system which can include, for example, inertias, stiffnesses, friction and/or optional mass dampers, can be optimized only for operating states, speeds or speed ranges for which the electric machine cannot supply a sufficient opposite-phase torque for reducing rotational irregularities or the electric machine cannot superpose a sufficient opposite-phase alternating torque on the internal combustion engine.

In some embodiment examples, the vibration reducing system can have for this purpose a substantially linear torque curve over a deflection corresponding at least to a proportion of 40% of the total deflection in which the vibration reducing system can be loaded. Accordingly, in some embodiment examples a softer configuration of the vibration reducing system can be carried out. For example, the deflection can be a rotational angle or twist angle and a total deflection can correspond to a total rotational angle or total twist angle in which the vibration reducing system can be deflected or turned. Accordingly, the vibration reducing system can be configured to bring about a characteristic torque curve depending on a deflection of the vibration reducing system which is substantially linear over a deflection corresponding to at least a proportion of 40% of a total deflection. A substantially linear torque curve may possibly be subject to small fluctuations of ±5% under some circumstances contingent upon assembly, material and/or operation. Thus the average and/or instantaneous torque curve can deviate with respect to slope by ±5% from a nominal or mean value over a total slope.

In addition or alternatively, the vibration reducing system in some further embodiment examples has a torque curve with at least two different slopes over a total deflection in which the vibration reducing system can be loaded. Accordingly, in some embodiment examples an expenditure on implementation of the vibration reducing system can be reduced. In an advantageous configuration, three different slopes can be formed. Accordingly, for a three-stage vibration reducing system there can be a vibration reduction characteristic or spring characteristic with three different slopes. For example, with a three-stage configuration the vibration reducing system can have one stage with a linear torque curve over a deflection corresponding at least to a proportion of 40% of the total deflection. In some circumstances, this may be the second stage. In addition, in some cases the first stage and the second stage can extend over a proportion of 40% of the total deflection. In embodiment examples in which the vibration reducing system is configured in two stages, i.e., has a maximum of two different stiffnesses or stages, the substantially linear torque curve can extend over a deflection which corresponds at least to a proportion of 60% or even 80% of a total deflection of the vibration reducing system. Further, the third stage or final stage of the vibration reducing system can serve in some embodiment examples to transmit vibrations or rotational irregularities having a value corresponding to between 100% and 120% of a maximum torque that can be delivered on the average by the internal combustion engine. This can be the torque that can be delivered by the internal combustion engine, for example. Accordingly, a safety range of the vibration reducing system could be provided with which torques which can result during unfavorable superposition of a maximum torque of the internal combustion engine and a torque component of the rotational irregularity could also be transmitted or absorbed.

In some further embodiment examples, the vibration reducing system has a substantially linear torque curve over a total deflection range in which the vibration reducing system can be loaded. Accordingly, a vibration reducing system with a particularly high energy storage capability could possibly be provided.

In some embodiment examples, the vibration reducing system has at least one spring element, and a torque path from an input side to an output side runs over the spring element, and the preload of the vibration reducing system is formed at least partially by a preload of the at least one spring element, and the preload of the at least one spring element is higher than an assembly-related preload. In some embodiment examples, the vibration reducing system can be implemented more economically. For example, the input side and the output side can be an input side of the vibration reducing system and an output side of the vibration reducing system. The features described with respect to the preload of the vibration reducing system can likewise apply to the preload of the spring element. Further, when the vibration reducing system has a plurality of spring elements the torque path can run or be transmitted completely over the plurality of spring elements. In addition or alternatively, the spring element can have a spring characteristic which brings about the described vibration reducing system characteristic or the corresponding characteristic torque curves. The spring element can be formed as a component which is suitable for transmitting a torque flow and, for example, can comprise an individual component or combination of components from the following: coil spring, torsion spring, torsion bar spring, flexing spring such as diaphragm spring, leaf spring or disk spring, pneumatic spring, gas compression spring, elastomer spring, or the like.

In addition or alternatively, in some embodiment examples a torque of the electric machine can be injected or can be coupled in between the vibration reducing system and the output side of the hybrid module. In this way, it could possibly be brought about that the torque applied for reducing the rotational irregularity is applied near the output side and accordingly also near a possible measurement point or a region at which the rotational irregularity is to be kept particularly small.

To this end or for other reasons, the electric machine can also be arranged between the vibration reducing system and the output side of the hybrid module in some further embodiment examples. Accordingly, in some cases an installation space of the hybrid module could be reduced in radial direction. An arrangement of the electric machine between the vibration reducing system and the output side of the hybrid module can be carried out, for example, in such a way that the vibration reducing system and the electric machine do not overlap in axial direction or have no overlapping regions in axial direction. The axial direction can be a rotational axis of the rotatable components of the hybrid module. The electric machine and the vibration reducing system can accordingly be arranged so as not to be nested one inside the other in radial direction. Optionally in other embodiment forms the electric machine and the vibration reducing system can have regions overlapping in axial direction. Accordingly, as the case may be, an installation space of the hybrid module could be reduced in axial direction.

In some embodiment examples, the electric machine can be disconnected from or connected to or coupled with the input side and/or the vibration reducing system via a clutch arrangement. Accordingly, the electric machine could be connected to the vibration reducing system according to need and/or operating state. In some embodiment examples of the hybrid module, the vibration reducing system is connected to the input side of the hybrid module so as to be fixed with respect to rotation relative to it in all operating states. Accordingly, the implementation of a clutch can be dispensed with if necessary.

In addition or alternatively, the hybrid module in some embodiment examples can be decoupled at an output side from a portion of the powertrain or residual powertrain following the output side. A clutch device can be provided for this purpose, for example. The clutch arrangement can be part of the hybrid module or part of the transmission as the case may be. For example, in cases where an automatic transmission is connected to the hybrid module, the transmission can be shifted to neutral to bring about the decoupling. In some embodiment examples, the hybrid module can be connected to, or comprise, a control circuit in order to effect the above-described separation. The clutch device or coupling device can be formed as a positive-locking clutch or friction-locking clutch, for example, a slip clutch, friction clutch or multiple-disk clutch.

In some further embodiment examples, the vibration reducing system comprises at least one two-mass flywheel and/or at least one power split and/or at least one torsional vibration damper. Optionally, the aforementioned systems can also be integrated in a clutch disk. In some embodiment examples, expenditure on implementation can accordingly be reduced. Optionally, the vibration reducing system can also be formed as exactly one of the above-described components. Under some circumstances, exactly one of the aforementioned components can be arranged between an input side and an output side of the hybrid module in order to bring about a complete transmission of the torque path. Accordingly, under some circumstances, the constructional expenditure for the hybrid module could be reduced. For example, the two-mass flywheel, the torsional vibration damper and the power split can be vibration reducing systems in which the torque path is transmitted completely via a spring element. These are not, for example, vibration reducing systems which can also be referred to as torsional vibration absorbers or mass dampers in which masses are deflected for tuning out vibrations, which masses do not also simultaneously contribute to the transmission of the torque path, i.e., lie in the torque path. However, the above-mentioned systems can be combined with a torsional vibration absorber.

In some further embodiment examples, the hybrid module has a control circuit or can be connected to a control circuit. By means of the control circuit, the electric machine can be controlled based on a detected rotational irregularity in such a way that the electric machine introduces a torque at the output side of the hybrid module which is directed opposite to the rotational irregularity in order to reduce it. For example, the reduction of rotational irregularity can be adjusted and/or controlled in a simple manner in this way. In embodiment examples in which the control circuit is not part of the hybrid module, the control circuit can also be implemented in a control device or a control circuit of the transmission, electric machine, internal combustion engine and/or of a vehicle control.

For example, the hybrid module can comprise at least one sensor for detecting the rotational irregularity or for detecting the occurrence of the rotational irregularity. By detecting the occurrence of the rotational irregularity via a sensor, the reduction of the rotational irregularity could be facilitated. This is possible because actually occurring rotational irregularities can be reacted to directly in this way. In some embodiment examples, information, for example, an order of excitation or superpositions resulting through operating states, can be detected in this way. A value, a direction and/or a quantity of rotational irregularity can possibly be detected by the sensor. The sensor can be arranged at or coupled to any location suited for detecting the occurrence of the rotational irregularity. For example. the sensor can be arranged at the vibration reducing system itself. To this end, a sensor can possibly be arranged at an input side and/or an output side of the vibration reducing system. In addition or alternatively, the sensor can be arranged at or coupled to an input side and/or an output side of the hybrid module. The sensor can also be constructed and arranged, for example, to detect the rotational irregularity at the electric machine, a shaft, a housing or the like. Any possible type of sensor suited for detecting a vibration or a rotational irregularity, for example, inductive sensors, piezo electric sensors, magnetoresistive sensors or the like, can be used as sensors.

Embodiment examples are further directed to a powertrain with a hybrid module according to at least one of the preceding embodiment examples which is coupled at its input side to an internal combustion engine and at its output side to a transmission. The transmission can be coupled on the output side to at least one drivable wheel. Under some circumstances, wear of components can be reduced and/or a driving behavior can be improved through the use of the hybrid module according to the embodiment example for reducing vibrations and rotational irregularities along the powertrain. For example, the internal combustion engine can be a device which converts fuel directly into a mechanical movement in a chemical process, for example, an Otto engine, diesel engine, Wankel engine, gas turbine or the like.

In addition or alternatively, the powertrain can also have at least one sensor which is configured and arranged to detect a rotational irregularity occurring in the powertrain. Accordingly, a torque of the electric machine acting against the rotational irregularity could be generated based on the rotational irregularity detected by the sensor.

In some embodiment examples, the sensor is arranged along a torque path from the internal combustion engine to the at least one driven wheel behind and/or in front of the hybrid module. By arranging at least one sensor outside of the hybrid module, the occurrence of rotational irregularities in the powertrain itself and/or in the functionally relevant components thereof, e.g., differential, transmission, chassis and/or body, for example, can be monitored and controlled in a corresponding manner. In some embodiment examples, the sensor arranged at the powertrain can be provided in addition to the sensor arranged at the hybrid module.

Embodiment examples are further directed to a motor vehicle with the hybrid module and/or a powertrain according to at least one of the preceding embodiment examples. For example, a pleasant driving feel could be brought about in the motor vehicle and wear of components at least reduced or even prevented through the described possibilities for reducing vibrations with the hybrid module.

BRIEF DESCRIPTION OF THE DRAWINGS

Further advantageous configurations will be described more fully in the following referring to embodiment examples shown in the drawings but without being limited to these embodiment examples. In the drawings.

DETAILED DESCRIPTION OF THE PRESENTLY PREFERRED EMBODIMENTS

In the following description of the accompanying drawings, like reference numerals designate like or comparable components. Further, summarizing reference numerals may be used for components and objects which occur several times in an embodiment example or in a drawing but which are collectively described with respect to one or several features. Components or objects designated by the same or summarizing reference numerals may be implemented alike but also differently with respect to individual features, several features or all features, such as, e.g., dimensioning, insofar as the context does not implicitly or explicitly indicate otherwise.

Figure 1:
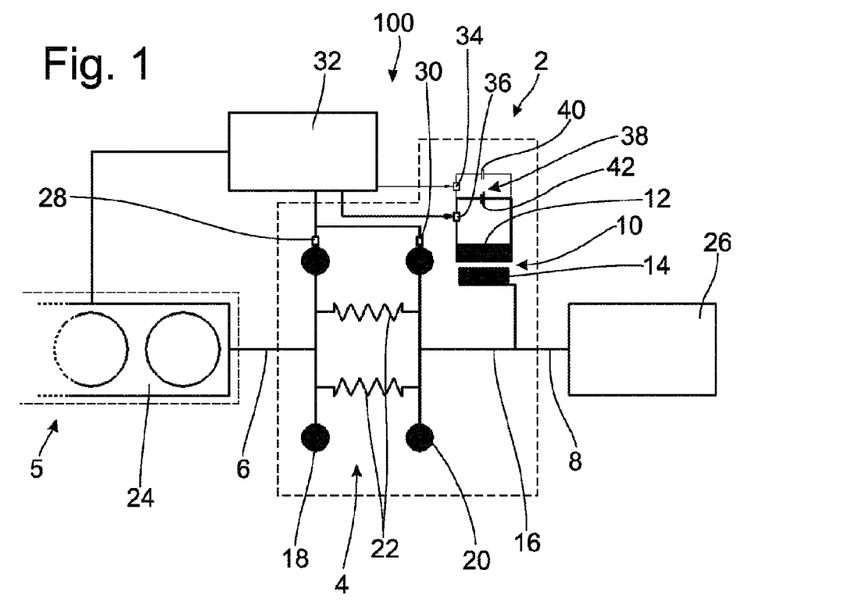
FIG. 1 is a schematic diagram of a powertrain with a hybrid module according to an embodiment example.

FIG. 1 shows a schematic diagram of a powertrain 100 with a hybrid module 2 according to an embodiment example and accordingly substantially describes a system construction. The hybrid module 2 comprises a vibration reducing system 4 which is coupled between an input side 6 and an output side 8 of the hybrid module 2. The vibration reducing system 4 is configured to reduce a rotational irregularity that is injected or coupled into the hybrid module 2. Therefore, the vibration reducing system 4 has a preload which is higher than an assembly-related preload. Further, the hybrid module 2 also comprises an electric machine 10. The electric machine 10 is coupled to the output side 8 of the hybrid module 2. Further, the electric machine 10 is configured to transmit a torque to the output side 8 that is directed opposite to a rotational irregularity injected or coupled into the hybrid module 2 so as to reduce this rotational irregularity. The electric machine 10 can also be coupled to the input side 6 of the hybrid module 2, which is not shown.

In the embodiment example according to FIG. 1, the electric machine 10, which can also be referred to as E-machine, comprises a stator 12 and a rotor 14. The rotor 14 can be rotated by or rotatably connected to a shaft 16 transmitting the torque, while the stator is fastened so as to be fixed with respect to rotation relative to the hybrid module 2 or the housing thereof. The stator 12 is arranged radially outwardly of the rotor 14 so that the electric machine 10 is an inner rotor. In some further embodiment examples, not shown, the electric machine can also be formed as an outer rotor and the rotor can be arranged radially outwardly of the stator.

In the embodiment example according to FIG. 1, the vibration reducing system 4 which can also be referred to as passive vibration reducing system optionally comprises a primary inertia 18, which can also be constructed as a primary mass, and a secondary inertia 20 which can also be constructed as a secondary mass. The primary inertia 18 is connected to the secondary inertia 20 via two spring elements 22. The spring element 22 is an example of a structure with which the stiffness and/or preload of the vibration reducing system 4 can be determined or brought about. Therefore, the spring elements can also be referred to as stiffness. All possible vibration reducing systems in which the torque path can be transmitted from the input side 6 to the output side 8 of the hybrid module 2 via a spring element can be used as vibration reducing system 4. The vibration reducing system 4 can be constructed, for example, as a two-mass flywheel or as damper in any possible form or combination. Also, in vibration reducing system 4 the torque path is transmitted from the primary inertia 18 via the spring elements 22 to the secondary inertia 20 or from an input side of the vibration reducing system 4 to an output side of the vibration reducing system 4. The complete torque path is transmitted via the two spring elements 22.

In some further embodiment examples, not shown, the vibration reducing system has only one spring element. Under some circumstances, the vibration reducing system can also have a different quantity of spring elements, for example, three, four or more.

As is shown in FIG. 1, the hybrid module 2 is connected at the input side 6 to an internal combustion engine 24 of a drive arrangement 5. The drive arrangement 5 can also comprise components such as, for example, a flywheel with a starter ring gear, not shown. The internal combustion engine 24 is the driving internal combustion engine. To this end, a torque is introduced on the input side 6 into the hybrid module 2 and transmitted via the vibration reducing system 4 and the shaft 16 to the output side 8. At the output side 8, the torque is transmitted to a residual powertrain 26. The residual powertrain 26 can comprise, for example, a transmission, a driveshaft, at least one side shaft or a plurality of side shafts, at least one wheel and/or further components of the vehicle.

By means of the vibration reducing system 4, some rotational irregularities that are injected or coupled into the hybrid module 2 can be reduced. For example, these rotational irregularities can be rotational irregularities that are generated in the internal combustion engine 24 and that are introduced into the hybrid module 2 with the torque that is to be transmitted via the hybrid module 2. Regardless of this, rotational irregularities can also be brought about by an operating state of the hybrid module 2 or the vehicle itself.

A reduction of the rotational irregularities can also be brought about with the electric machine 10 in that a torque which is directed opposite to the rotational irregularity is impressed on the shaft 16. A control circuit 32 by means of which the electric machine 10 is controlled for active vibration reduction is associated with the hybrid module 2. To this end, the control circuit 32 obtains status signals or system state signals containing information about the rotational irregularity. A value of the torque to be applied by the electric machine 10 as well as the direction of this torque is determined. For example, the system status signals from the internal combustion engine 24 or the control circuit thereof can be transmitted to the control circuit 32.

In the hybrid module 2 according to the embodiment example in FIG. 1, the occurrence of a rotational irregularity is also detected for this purpose. To this end, two sensors 28 and 30 are provided, which can also be referred to as status detection sensors. The latter can deliver the system status signals in addition to or as an alternative to the internal combustion engine 24 or control circuit thereof. The additional sensors 28 and 30 are arranged at the primary inertia 18 and at the secondary inertia 20 in the embodiment example in FIG. 1.

In some further embodiment examples, not shown, the sensors can be provided in addition or alternatively at a different location of the hybrid module and/or other areas of the powertrain or other locations of the vibration reducing system. Further, at least one sensor or a plurality of sensors can be provided for this purpose.

The system status signals that are obtained by the control circuit 32 can be speed angles and/or a rotational acceleration, for example. The control circuit 32 which can also be constructed as a control unit and/or adjusting unit processes the system status signals to form controlled variables. These controlled variables can then be used to control the electric machine 10 in a corresponding manner. The electric machine 10 can be controlled to apply to the shaft 16 a torque directed opposite to the detected rotational irregularity. In addition or alternatively, the oppositely directed torque can also be injected or coupled in other areas of the hybrid module 2 through the electric machine 10.

In some embodiment examples, the electric machine 10 is controlled only as a function of the quantities detected by the sensors without including signals and/or information of the internal combustion engine 24.

The hybrid module 2 also comprises a storage unit 38 with a capacitor 40 and a battery 42. Energy which has been converted into electrical energy in generator mode of the electric machine can be stored in the storage unit 38. The capacitor 40 and battery 42 are connected to one another in parallel. Under some circumstances, the capacitor 40 can be better suited for a fast storage and discharge of small amounts of energy and the battery 42 can be better suited for longer storage and discharge of larger amounts of energy. In some other embodiment examples, not shown, the storage unit can be configured in another manner and, for example, can comprise only the battery or only the capacitor.

Based on the controlled variable generated by the control circuit 32, the electric machine 10 can be controlled, for example, through actuation of switch 34 and/or switch 36, such that the electric machine 10 generates an alternating torque which is cancelingly superimposed on that of the internal combustion engine 24. Specifically, the vibration energy which is converted into electrical energy by the electric machine 10 can be taken from the storage unit 38 for this purpose. In order to apply a torque in the opposite direction, vibration energy or mechanical energy can be converted into electrical energy, for example, and stored in the storage unit 38.

Figure 2:
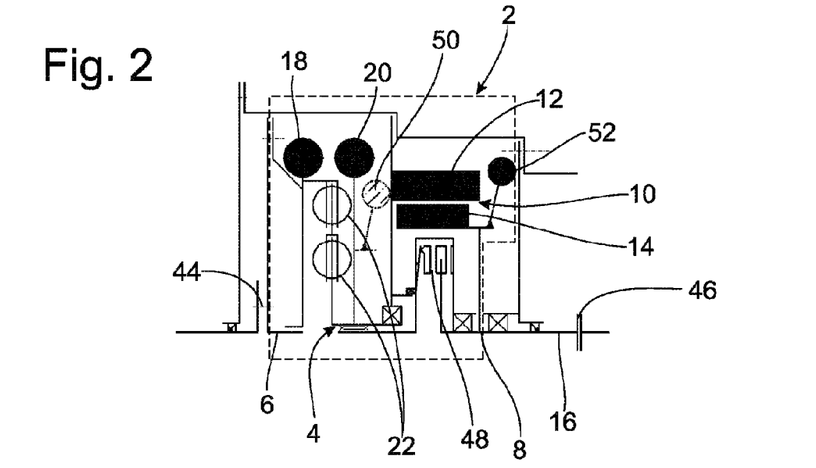
FIG. 2 is a schematic diagram of the hybrid module according to FIG. 1.

FIG. 2 shows a schematic diagram of the hybrid module 2 according to FIG. 1. The hybrid module 2 from FIG. 2 is constructed substantially analogous to the hybrid module 2 from FIG. 1 and, for this reason, only some differences between the two modules are described in the following. Substantially identical components are designated by the same reference numerals.

The hybrid module 2 of FIG. 2 is connected to a crankshaft and, accordingly, to the internal combustion engine 24, not shown, via a flexible connection plate 44, shown schematically. The hybrid module 2 can be connected at its output side 8 to the residual powertrain 26, not shown, via a coupling device 46 which may also be referred to as a transmission disconnect clutch.

The electric machine 10 can be connected to or disconnected from the vibration reducing system 4 or the input side 6 of the hybrid module 2 via a further coupling device 48 which can also be referred to as engine disconnect clutch.

Further, in the embodiment example of the hybrid module 2 from FIG. 2, the vibration reducing system 4 and rotor 14 of the electric machine 10 both include a mass damper 50 and a mass damper 52. The vibration reducing system 4 can be constructed as described referring to FIG. 1, for example, and can additionally include the mass damper 50 for damping rotational irregularities. For this purpose, mass dampers 50 and 52 can have masses which are deflected but do not contribute to the transmission of torque. Mass dampers 50 and 52 can be constructed, for example, as fixed frequency mass dampers or as order absorbers, possibly in the form of a Sarazin-type pendulum. In a further embodiment example, not shown, the hybrid module 2 cannot have the two mass dampers 50 and 52 or can have only one of the two mass dampers.

Figure 3:
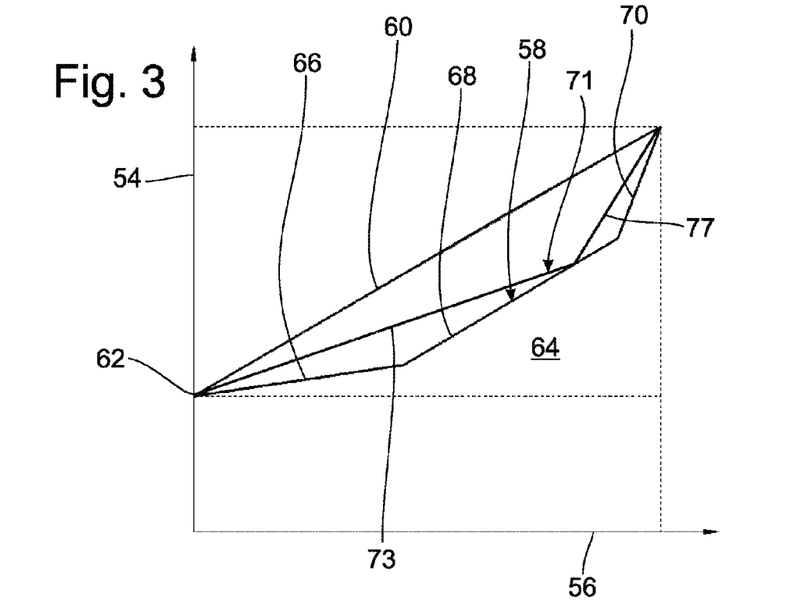
FIG. 3 is a schematic diagram of a torque curve relative to a deflection of a vibration reducing system of a hybrid module according to an embodiment example.

FIG. 3 shows a schematic diagram of a torque curve relative to a deflection of the vibration reducing system 4 of the hybrid module 2 according to an embodiment example. A torque is plotted along an ordinate 54 of a graph versus a deflection of the vibration reducing system 4 on an abscissa 56. A rotational angle, for example, a rotational angle in which the primary inertia 18 is rotated relative to the secondary inertia 20 is plotted on the abscissa 56 as deflection quantity.

Three different characteristic lines 58, 60 and 71 are plotted in the graph of FIG. 3. These different characteristic lines 58, 60 and 71 result for different embodiment examples of vibration reducing systems 4. Characteristic lines 58, 60 and 71 and, therefore, their vibration reducing systems 4 have in common that they have a preload. Thus a characteristic line of the vibration reducing system 4 plotted in a graph in FIG. 3 results from a torque curve of a torque to be transmitted depending on a deflection which can also be referred to as preloaded spring characteristic. A torque corresponding to the preload is designated by reference numeral 62. Even without deflection or at a rotational angle of 0°, the torque which corresponds to the preload and which is accordingly greater than zero (0) and can also be referred to as starting torque must be applied to bring about a deflection or a rotation. Thus torques lower than the starting torque do not lead to a response of the vibration reducing system 4. Rotational irregularities bringing about a torque component that is smaller than torque 62 can be reduced in the hybrid module 2 with the vibration reducing system 4 by controlling the electric machine 10 in a corresponding manner. The use of a vibration reducing system 4 with a characteristic line according to FIG. 3 in the hybrid module 2 is possible in that the vibration reduction is supported by the electric machine 10.

Two effects which are important for the vibration reduction behavior can be achieved in that the vibration reducing system 4 has the preload shown in FIG. 3 by characteristic lines 58, 60 and 71. First, the energy that can be stored in the vibration reducing system 4 is increased. The energy that can be stored in the spring element 22 or in the vibration reducing system 4 is determined by an area 64 below the characteristic line in a torque-rotational angle diagram. This is made clear, for example, by comparing with FIG. 5 which shows a schematic diagram of a torque curve relative to a deflection of a conventional vibration reducing system.

Figure 5:
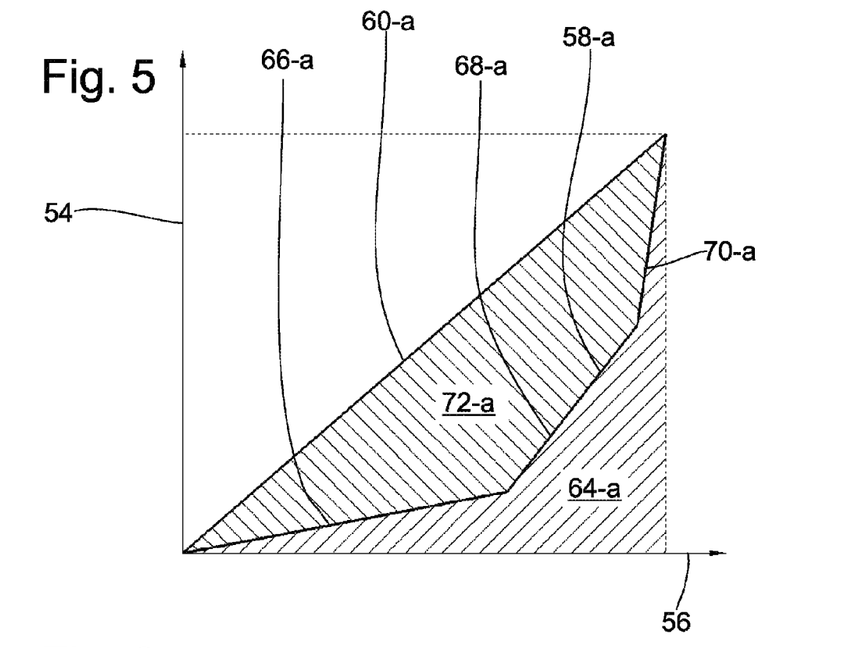
FIG. 5 is a schematic diagram of a torque curve relative to a deflection of a conventional vibration reducing system.

Compared with FIG. 3, FIG. 5 shows a torque-rotational angle diagram of this type for a conventional vibration reducing system without preload. In this respect, characteristic lines 58-a and 60-a result for different forms of conventional vibration reducing systems. Since these conventional vibration reducing systems have no preload and the characteristic lines 58-a and 60-a both pass through the zero point, an area 64-a formed below characteristic line 58-a is smaller than the comparable area 64 in the diagram in FIG. 3. Areas 64 and 64-a show the spring work below the multi-stage characteristic line. In the conventional vibration reducing system for which characteristic line 58-a is indicated, rotational irregularities or torsional stressing occurring at low or medium torques and torque amplitudes, e.g., during idling or crawling of the vehicle or internal combustion engine, can be reduced in a first, very soft stage 66-a which may also be referred to as start or idling stage. The first stage 66-a is followed by a further, medium-soft portion as second stage 68-a which may also be referred to as driving stage. This second stage 68-a serves for reducing or decoupling at medium to high rotational irregularities which can occur, for example, under full load or during an acceleration. In some further embodiment examples, not shown, depending on the adjustment that is wanted or needed, the second stage can have further knees with different or changing stiffnesses or slopes to obtain an approximately progressive characteristic line. The vibration reducing system to which characteristic line 58-a corresponds has as third stage 70-a, which can also be designated as stop stage, a relatively stiff region. High torques such as those that can occur, for example, over an overload or impact, are to be absorbed in this relatively stiff region. Characteristic line 58-a can also be referred to as conventional spring characteristic line of a rotational irregularity reducing system. In contrast, characteristic line 58 in FIG. 3 is the improved characteristic line which is made possible through support of the electric machine 10. This also includes three stages 66, 68 and 70.

Compared with area 64-a below characteristic line 58-a which is given as a measure of the energy storage capability of the conventional vibration reducing system which corresponds to the characteristic line 58-a with the double knee, a vibration reducing system for which characteristic line 60-a is indicated has a maximum working capacity or an energy storage capability at the same maximum torque and deflection or rotational angle. A conventional vibration reducing system of this kind has a linear characteristic line. Compared to the energy storage capability of the vibration reducing system with characteristic line 60-a, the vibration reducing system with characteristic line 58-*a* loses the energy storage capability of area 72-*a* which can also be referred to as spring work of the one-stage spring, the one-stage vibration reducing system or the one-stage characteristic line 60-*a*. This is due to the compromise between the described requirements from different operating states.

Further, it can be seen clearly from the shape of characteristic lines 60-*a* and 58-*a* that the vibration reducing system corresponding to characteristic line 58-*a* has an appreciably greater stiffness in the second stage 68-*a*, i.e., the driving range, than the substantially linear characteristic line 60-*a* of the other vibration reducing system. In addition, the decoupling brought about in this range is worse.

The characteristic lines and torque curves described for FIG. 5 can apply, for example, to all possible vibration reducing systems such as two-mass flywheels, damper systems and converters of phase shifters of power-split rotational irregularity reducing systems and/or spring elements thereof.

In addition to the increased energy storage capability as can be seen from the comparison of areas 64 and 64-*a*, another effect of the preload is that the vibration reducing system 4 for comparable deflections can have smaller stiffnesses and, therefore, smaller slopes than conventional vibration reducing systems to which the torque curves and characteristic lines 60-*a* and 58-*a* according to FIG. 5 correspond. Characteristic lines 60-*a* and 58-*a* run through the zero point at the same maximum torque and deflection or rotational angle in order to be able to cover all load states, that is, also those with low torque. As a result, all characteristic line positions of characteristic lines 60 and 58 according to FIG. 3 have a lower stiffness or slope than the comparable characteristic lines 60-*a* and 58-*a* shown in FIG. 5 for conventional vibration reducing systems without preload. Particularly the second stage 68 of characteristic line 58 can be less stiff than the corresponding second stage 68-*a* in vibration reducing systems without preload. Further, the first stage 66 and second stage 68 of the vibration reducing system 4 cover a deflection corresponding to 40% of a total deflection.

Analogous to the vibration reducing system corresponding to characteristic line 60-*a*, the vibration reducing system 4 to which characteristic line 60 corresponds would be particularly suitable for storing as much energy as possible because, as linear characteristic line, it has the smallest slope over the entire deflection range or angular range and, therefore, also shows the maximum possible spring work.

Due to the fact that certain torques for the passive vibration reducing system 4 are removed by the preload or that these torques do not lead to a response of the vibration reducing system 4, the vibration reducing system 4 can be configured for a smaller operating range of the hybrid module. In the other operating range in which rotational irregularities are generated with torque components which cannot be compensated or reduced by the passive vibration reducing system 4, the damping or reduction of these rotational irregularities is carried out by means of the electric machine 10. Since the other operating states do not lead to a deformation of the vibration reducing system 4 or the spring element 22 thereof, a larger deformation path of the vibration reducing system 4 or spring element 22 thereof remains available for the other operating states with higher speeds.

The fact that the electric machine 10 is used to reduce the rotational irregularities in a low speed range can be attributed to the behavior of the electric machine 10 at different speeds, for example. This behavior is described more exactly referring to FIGS. 4 and 6. The electric machine 10 can be operated in motor mode, i.e., as an electric-mechanical converter, and in generator mode, i.e., as mechanical-electric converter. When the electrical storage unit 38 is connected downstream of the electric machine 10, a storage for energy can be formed in a manner substantially analogous to that described for the passive vibration reducing system 4 or a spring or the spring element 22.

Figure 4:
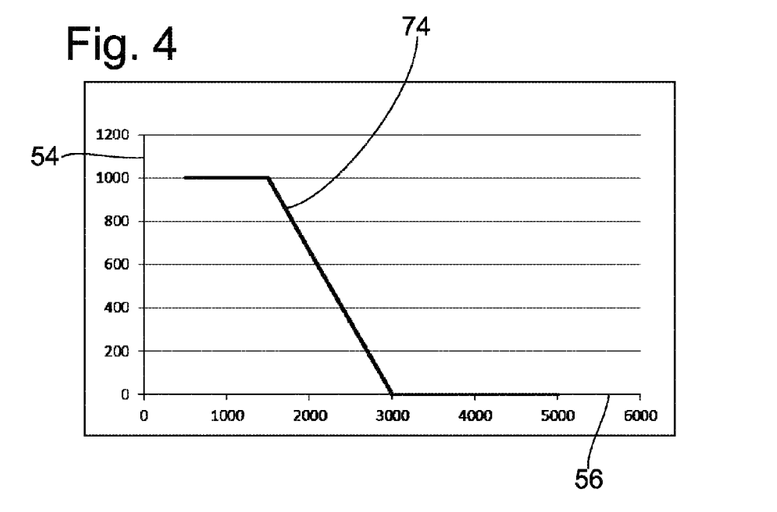
FIG. 4 is a schematic diagram of a quantified torque curve relative to a speed of an electric machine for a hybrid module according to an embodiment example.
Figure 6:
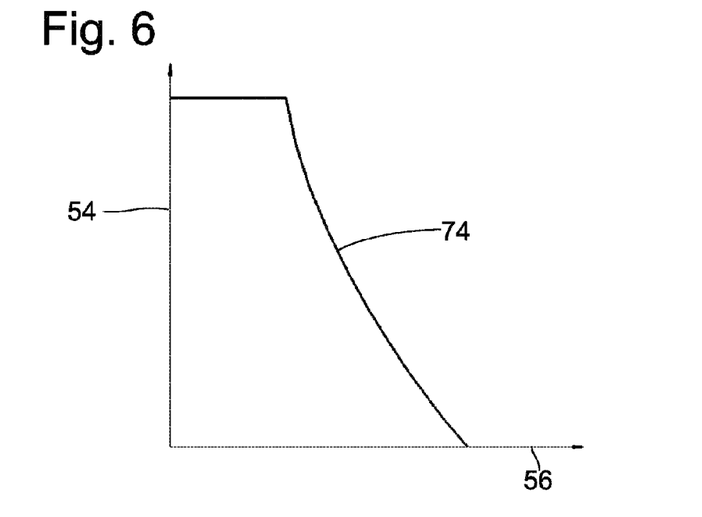
FIG. 6 is a schematic diagram of a torque curve relative to a speed of an electric machine for a hybrid module according to an embodiment example.

FIGS. 4 and 6 show a schematic diagram of a torque curve relative to a speed of the electric machine 10 for the hybrid module 2 according to an embodiment example. A torque is plotted in a graph along the ordinate 54 relative to a speed along the abscissa 56. The torque is the torque that can be delivered or received by the electric machine 10. It can be seen from a shape of a torque characteristic line 74 for the electric machine 10 that the electric machine 10 can deliver a high torque at a low speed and can only deliver lower torque at higher speeds.

When the internal combustion engine 24 delivers a torque surplus or power surplus, for example, the electric machine 10 can convert this into electrical energy in generator mode and buffer it in one of the storage units 38 so that when the internal combustion engine 24 undergoes a downward fluctuation in torque or power this can be compensated in motor mode from the storage or storage unit 38. This corresponds to the principle of active vibration reduction.

FIG. 4 shows a torque curve of this type for the electric machine 10 in a concrete embodiment example. A torque amplitude of the electric machine 10 is plotted along the ordinate 54 in N m relative to a speed along the abscissa 56. As can be seen from characteristic line 74 for the specific embodiment example of the electric machine 10 according to FIG. 4, the available torque drops sharply, for example, at a speed just below 2000 RPM. In contrast to FIG. 6, the diagram in FIG. 4 shows a quantified torque curve for a fuller explanation of a manner of operation of a hybrid module 2 according to embodiment examples in combination with FIGS. 7, 8 and 9.

Figure 7:
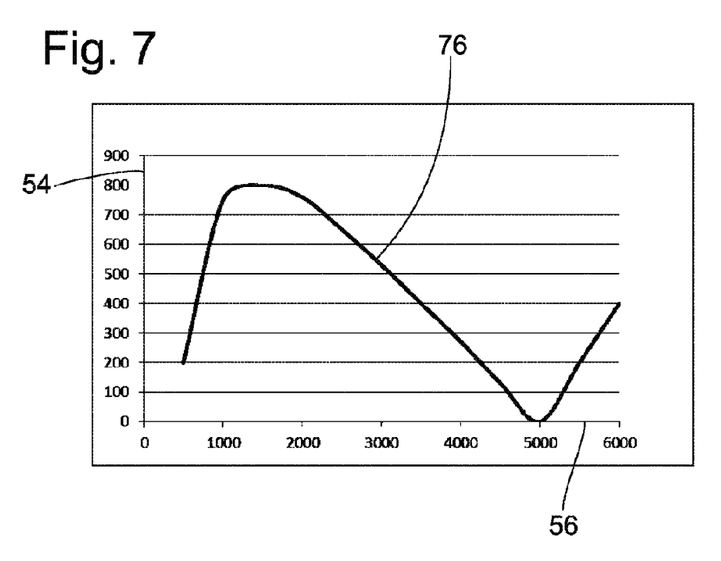
FIG. 7 is a schematic diagram of a quantified torque curve relative to a speed of an internal combustion engine according to an embodiment example.

FIG. 7 shows a schematic diagram of a quantified torque curve relative to a speed of an internal combustion engine according to an embodiment example. This relates to a torque amplitude of the main excitation order in the form of the internal combustion engine 24 for the hybrid module 2. The curve for an excitation torque amplitude in case of a second order of the internal combustion engine 24, which is constructed as a four-cylinder engine, is plotted relative to a speed as characteristic line 76. The excitation torque amplitudes are shown in newton meters (N m) along the ordinate 54 relative to the speeds plotted on the abscissa 56. The maximum excitation torque occurs at approximately 1000 RPM. A minimum of the excitation torque amplitude is at approximately 5000 RPM. The minimum can result, for example, due to an extinction of gas forces and mass forces in the four-cylinder engine.

Figure 8:
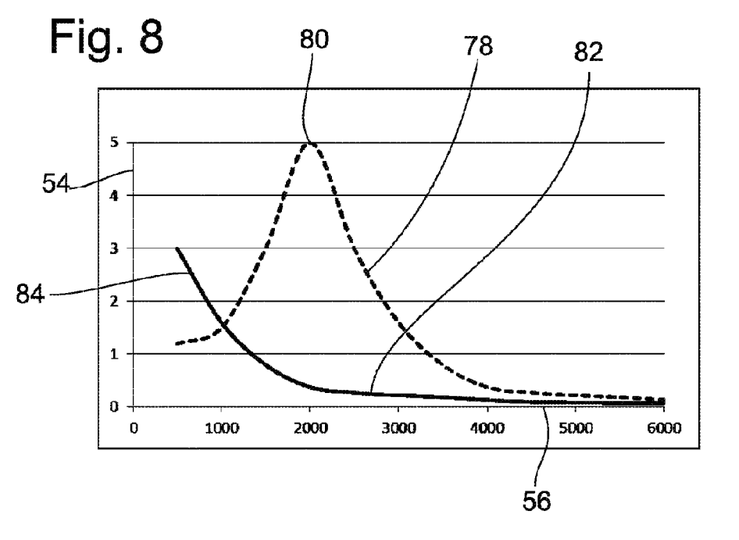
FIG. 8 is a schematic diagram of a plurality of transfer functions for a plurality of torque curves of a torque component of a rotational irregularity relative to a speed in a hybrid module.

FIG. 8 shows a schematic diagram of a plurality of transfer functions for a plurality of torque curves of a torque component of a rotational irregularity relative to a speed for a vibration reducing system without the support of the electric machine 10. The transfer functions contain information about a ratio of an output side to an input side of the vibration reducing system 4. The quantities set in proportion to one another can be, for example, vibration angles, vibration angle velocities, rotational accelerations and/or alternating torques.

A behavior resulting in a vibration reducing system corresponding to characteristic line 60-*a* in FIG. 5, i.e., without preload and without support of the electric machine 10, is given by transfer function 78. Owing to the relatively high stiffness, a resonance rise 80 occurs in a driving range, i.e., for example, at speeds of 2000 RPM. Accordingly, the transfer function 78 contains information about a state in a hybrid module with a conventional vibration reducing system without preload and without support of the electric machine 10.

Further, FIG. 8 also shows a transfer function 82 which would result for a vibration reducing system 4 with characteristic line 60 from FIG. 3, i.e., with support of the electric machine 10 which, however, is constructed in a single stage. A resonance point 84 or resonance range does not lie in the immediate driving range, i.e., for example, outside of speeds around 2000 RPM. Instead, a high amplitude occurs at low speeds. The high amplitude is designated by reference numeral 84 and occurs at a speed below 1000 RPM. Already at speeds greater than 2000 RPM, the transfer function 83 drops sharply and then hugs the abscissa 56 asymptotically. Accordingly, at speeds above 1000 RPM, no critical resonance rises, vibrations or rotational irregularities occur in the embodiment example for which the transfer function 82 is given.

Figure 9:
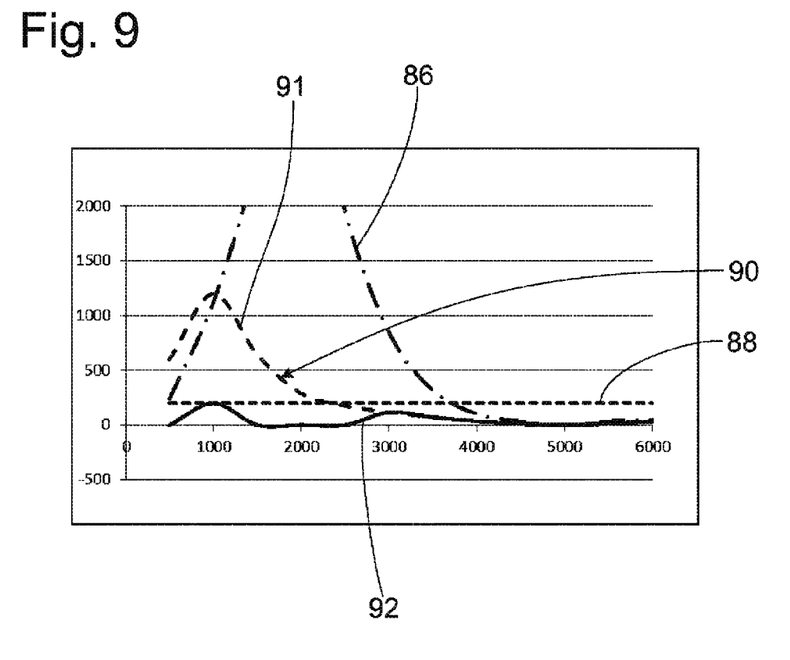
FIG. 9 is a schematic diagram of a plurality of torque curves of a torque component of a rotational irregularity relative to a speed in a hybrid module according to an embodiment example.

FIG. 9 shows a schematic diagram of a plurality of torque curves of a torque component of a rotational irregularity relative to a speed in a hybrid module 2 according to an embodiment example. FIG. 9 shows the ratios at the transmission input shaft or at an output side 8 of the hybrid module 2, for example, when the engine excitation from FIG. 7 is multiplied by the transfer functions 78 and 82, respectively, from FIG. 8.

Without using the electric machine 10 to reduce torsional irregularities, i.e., without support of the electric machine 10, a torque curve according to characteristic line 86 would result from the transfer function 78 of FIG. 8. The torque curve according to characteristic line 86 shows an alternating torque at the transmission input shaft in a conventional configuration. A limit curve 88 which shows a tolerance in which rotational irregularities may occur or are accepted is greatly exceeded.

FIG. 9 also shows characteristic lines 90 and 92 for torque curves resulting from an action of the electric machine 10 in connection with the vibration reducing system 4 at a transmission input shaft with which the hybrid module 2 is coupled. The torque curve, the vibration behavior or the rotational irregularity reduction can be improved through the use of the electric machine 10 as supporting element for reducing rotational irregularities. The aim is to damp all occurring rotational irregularities until they do not exceed the limit curve 88 that corresponds to a target preset for reducing rotational irregularities. The limit curve 88 is formed as a straight line which lies at a torque of less than 250 N m for all speeds.

When the electric machine 10 is utilized in such a way that not all operating states are to be covered anymore by the passive vibration reducing system 4 such as, for example, area 66-a in FIG. 5 not required for low-load states, a torque curve or behavior according to characteristic line 90 is given as first improvement. Characteristic line 90 shows an alternating torque which occurs at the transmission input shaft using a vibration reducing system 4 with a one-stage curve to which characteristic line 60 corresponds, but still without active reducing torque through the electric machine 10. The use of a preloaded vibration reducing system 4 results in the occurrence of rotational irregularities lying above the limit curve 88, as can be seen in portion 91 of characteristic line 90, at lower speeds, i.e., before the preloaded vibration reducing system 4 engages.

If the electric machine 10 is engaged or controlled in opposite phase with its torque capacity as shown, for example, in FIG. 6 or FIG. 4, a reduced torque curve according to characteristic line 92 may result. Accordingly, the excitation can be reduced to the curve shown as characteristic line 92. The occurring rotational irregularities then all still have torque components lying below the limit curve 88. Characteristic line 92 shows the alternating torque which occurs at the transmission input shaft with a configuration of the vibration reducing system 4 and the support of the electric machine 10.

In some further embodiment examples, not shown, conventional operating states or speeds thereof, limiting values or critical rotational irregularities may have other values depending on application.

Accordingly, some embodiment examples are directed to the hybrid module 2 with a system for active vibration reduction through the electric machine 10 and an additional system 4 for passive vibration reduction. In this respect, regions for preferred vibration reduction by the passive vibration reducing system 4 and regions for vibration reduction through the active vibration reducing system 10 can possibly be determined. In some embodiment examples the passive vibration reducing system can be configured depending on the preferred region of vibration reduction for these systems. To this end, components such as stiffness of the springs, quantity of stages, etc. can possibly be adapted. The electric machine 10 can be arranged and/or incorporated either upstream or downstream of the passive or additional vibration reducing system 4. Accordingly, a combination of a rotational irregularity reducing system with active vibration reduction through the electric machines is described.

Figure 10:
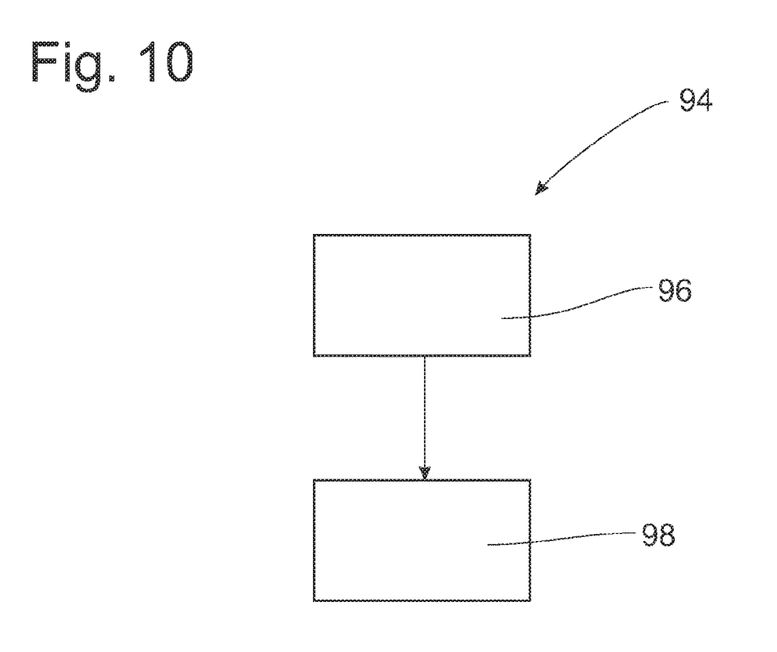
FIG. 10 is a schematic diagram of a method for reducing a rotational irregularity.

FIG. 10 is a schematic diagram of a method 94 for reducing a rotational irregularity. Vibration reduction is carried out in a first process 96 in the method 94. This is carried out by means of a vibration reducing system 4 that is coupled between an output side 8 and an input side 6 of the hybrid module 2 and which is configured to reduce an injected rotational irregularity. The vibration reducing system 4 has a preload which is higher than the assembly-related preload. In a second process 98, a torque directed opposite to the injected rotational irregularity is introduced into the hybrid module 2 by means of an electric machine 10 and is coupled to the output side 8 of the hybrid module 2. Processes 96 and 98 can be carried out in different sequence, simultaneously and/or so as to partially overlap.

Figure 11:
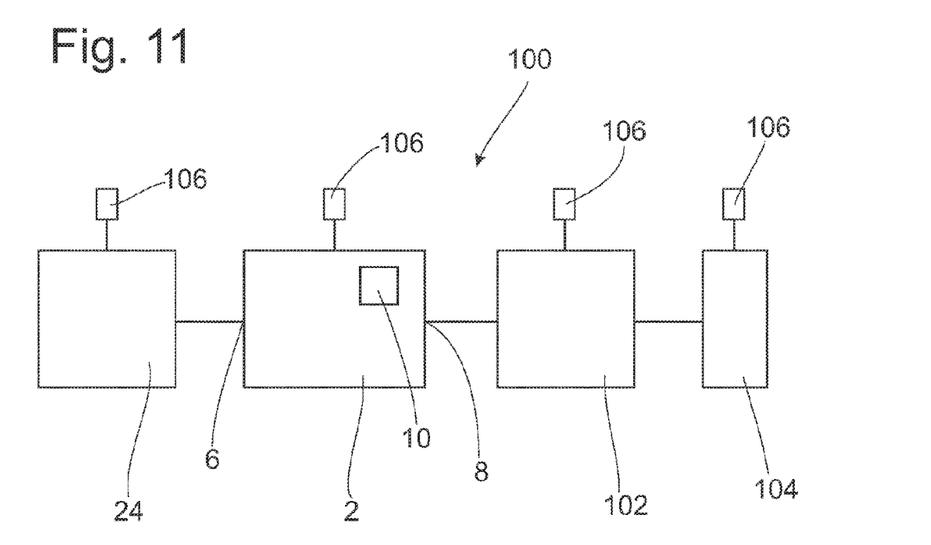
FIG. 11 is a schematic diagram of a powertrain with a hybrid module according to an embodiment example.

FIG. 11 shows a schematic diagram of the powertrain 100 with a hybrid module 2 according to an embodiment example. The hybrid module 2 is coupled at its input side 6 to an internal combustion engine 24. At its output side 8, the hybrid module 2 is coupled to a transmission 102. Further, at least one drivable wheel 104 can be coupled to the transmission 102. At least one sensor 106 can be arranged at the powertrain 100. The sensor 106 is configured and arranged to detect a rotational irregularity occurring in the powertrain 100. A torque acting counter to the rotational irregularity can then be generated by the electric machine 10 based on the rotational irregularity detected by sensor 106. It may be possible to position the sensor 106 at a location in the powertrain 100 at which vibrations or rotational irregularities should occur as little as possible for technical reasons related to function. In this way, it is possible to react to actually occurring rotational irregularities. For example, the sensor 106 or a plurality of sensors can be arranged at a chassis or at the wheel 104, transmission 102, internal combustion engine 24 and/or other parts of the vehicle body, not shown. Under some circumstances, the hybrid module 2 itself can additionally comprise sensors 28 and 30 according to the embodiment example of FIG. 1. In some embodiment examples, sensors 28 and 30 can be dispensed with when sensor 106 is arranged at powertrain 100.

Figure 12:
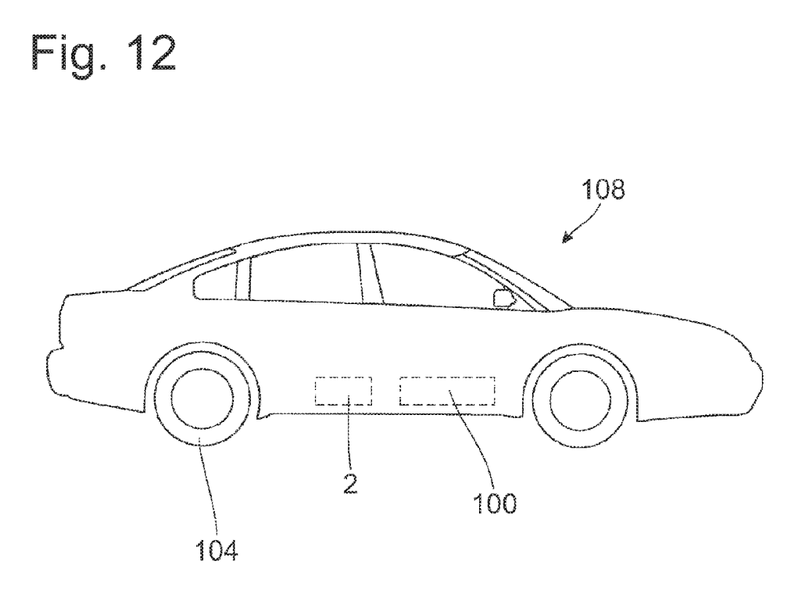
FIG. 12 is a schematic diagram of a motor vehicle with a powertrain and/or a hybrid module according to an embodiment example.

FIG. 12 shows a schematic diagram of a motor vehicle 108 with a powertrain 100 and/or a hybrid module 2 according to an embodiment example. For example, sensors 106 can be arranged at all possible locations of the motor vehicle 108 or the body thereof.

The embodiment examples and individual features thereof disclosed in the preceding description, the following claims and the accompanying drawings may be of importance and implemented both individually and in any combination for the realization of an exemplary embodiment in its various forms.

In some further embodiment examples, features which are disclosed as a device feature in other embodiment examples can also be implemented as method features. Further, features which are implemented as method features in some embodiment examples may possibly be implemented as device features in other embodiment examples.

The invention claimed is:

1. A hybrid module (2) comprising:
an output side (8) and an input side (6);
a vibration reducing system (4) coupled between the output side (8) and the input side (6) configured to reduce a rotational irregularity that is coupled in, wherein the vibration reducing system (4) has at least one spring element (22); wherein a torque path from the input side (6) to the output side (8) runs over the spring element (22); wherein the preload of the vibration reducing system (4) is formed at least partially by a preload of the at least one spring element (22); and wherein the preload of the at least one spring element (22) is greater than an assembly-related preload; and
an electric machine (10) coupled to the input side (6) or to the output side (8) of the hybrid module (2) and configured to introduce a torque at the input side (6) or at the output side (8) which is directed against a rotational irregularity coming from an internal combustion engine (24) in order to reduce the rotational irregularity.

2. The hybrid module according to claim 1, wherein the preload corresponds at least to a proportion of 5% of a maximum torque that can be coupled at the input side (6).

3. The hybrid module according to claim 1, configured to be coupled with the internal combustion engine (24), wherein the preload corresponds to a torque which is greater than a torque component of a rotational irregularity occurring during starting or in a lower speed range of the internal combustion engine (24).

4. The hybrid module according to claim 1, wherein the vibration reducing system (4) is configured to reduce the rotational irregularity more sharply at a second speed than at a first speed at which a torque can be introduced by the electric machine (10) for reducing the rotational irregularity.

5. The hybrid module according to claim 1, wherein the vibration reducing system (4) has a substantially linear torque curve (60, 58) over a deflection corresponding at least to a proportion of 40% of the total deflection in which the vibration reducing system (4) can be loaded.

6. The hybrid module according to claim 1, wherein the vibration reducing system (4) has a torque curve (58) with at least two different slopes (73, 77) over a total deflection in which the vibration reducing system (4) can be loaded.

7. The hybrid module according to claim 1, wherein the vibration reducing system (4) has a substantially linear torque curve over its total deflection.

8. The hybrid module according to claim 1, wherein a torque of the electric machine (10) can be introduced between the vibration reducing system (4) and the output side (8) of the hybrid module (2) and/or the electric machine (10) is arranged between the vibration reducing system (4) and the output side (8) of the hybrid module (2).

9. The hybrid module according to claim 1, wherein the vibration reducing system (4) comprises at least one two-mass flywheel and/or at least one power split and/or at least one torsional vibration damper.

10. The hybrid module according to claim 1, additionally comprising a control circuit (32) configured such that the electric machine (10) is controlled based on a detected rotational irregularity in such a way that the electric machine (10) introduces a torque at the output side (8) which is directed opposite to the rotational irregularity in order to reduce the rotational irregularity.

11. The hybrid module according to claim 1, additionally comprising at least one sensor (28, 30, 106) for detecting an occurrence of the rotational irregularity.

12. A powertrain (100) comprising:
a hybrid module (2);
a vibration reducing system (4) comprising at least one spring element (22); wherein a torque path from the input side (6) to the output side (8) runs over the spring element (22); wherein the preload of the vibration reducing system (4) is formed at least partially by a preload of the at least one spring element (22); and wherein the preload of the at least one spring element (22) is greater than an assembly-related preload; and
wherein the hybrid module is coupled at its input side (6) to an internal combustion engine (24) and at its output side (8) to a transmission (26) having an output side for coupling to at least one drivable wheel (104).

13. The powertrain according to claim 12, further comprising at least one sensor (106) configured and arranged to detect a rotational irregularity occurring in the powertrain (100); and wherein a torque of the electric machine (10) acting against the rotational irregularity is generated based on the rotational irregularity detected by the sensor (106).

14. The powertrain according to claim 13, wherein the sensor (106) is arranged along a torque path from the internal combustion engine (24) to the at least one driven wheel (104) behind and/or in front of the hybrid module (2).

* * * * *